United States Patent [19]
Bartlett

[11] Patent Number: 5,055,840
[45] Date of Patent: Oct. 8, 1991

[54] INFRARED TOUCH INPUT DEVICE AND LIGHT EMITTED ACTIVATION CIRCUIT

[75] Inventor: Alan L. Bartlett, New Braunfelf, Tex.

[73] Assignee: Carroll Touch Incorporated, Round Rock, Tex.

[21] Appl. No.: 609,128

[22] Filed: Nov. 1, 1990

Related U.S. Application Data

[63] Continuation of Ser. No. 465,837, Jan. 16, 1990, abandoned.

[51] Int. Cl.$^5$ ............................................. H03K 17/94
[52] U.S. Cl. ....................................... 341/31; 250/206; 340/712
[58] Field of Search ................. 250/206; 340/530, 712, 340/762, 782, 802, 710, 718; 341/5, 26, 31; 315/164, 170, 173; 363/60; 368/83, 241, 67; 178/18

[56] References Cited

U.S. PATENT DOCUMENTS

| | | | |
|---|---|---|---|
| 4,190,836 | 2/1980 | Kimura et al. | 340/762 |
| 4,207,466 | 6/1980 | Drage et al. | 250/221 X |
| 4,267,443 | 5/1981 | Carroll et al. | 250/221 |
| 4,291,369 | 9/1981 | Hochstrate | 363/60 |
| 4,313,109 | 1/1982 | Funk et al. | 340/712 X |
| 4,335,453 | 6/1982 | Fatton | 368/67 X |
| 4,605,848 | 8/1986 | Ogawa | 250/205 |
| 4,665,323 | 5/1987 | Russell et al. | 363/60 X |
| 4,761,637 | 8/1988 | Lucas et al. | 340/365 |
| 4,766,425 | 8/1988 | Tallman et al. | 340/712 |
| 4,806,749 | 2/1989 | Ohuchi et al. | 340/712 X |
| 4,904,857 | 2/1990 | Ando et al. | 250/205 |

*Primary Examiner*—Ulysses Weldon
*Attorney, Agent, or Firm*—Anton P. Ness; Robert W. Pitts

[57] ABSTRACT

A touch input device, suitable for use in detecting the presence of an opaque element within a display area bounded by light emitting elements and light detecting elements includes light emitter activating circuitry in which the light emitting elements are individually selectable. Each light emitting element is contained within a matrix and source drivers and sink drivers are effective to select a specific row and column address for each individual light emitter. Current for the light emitters is provided by a voltage source which is chosen for compatibility with the logic used in the touch input system. A charge pump operating sequentially with the selection light emitting elements is used to establish a voltage greater than the normal supply voltage to overcome the voltage drops of the source and sink driver and the activated light emitter to insure light emission greater than a minimum threshold.

26 Claims, 10 Drawing Sheets

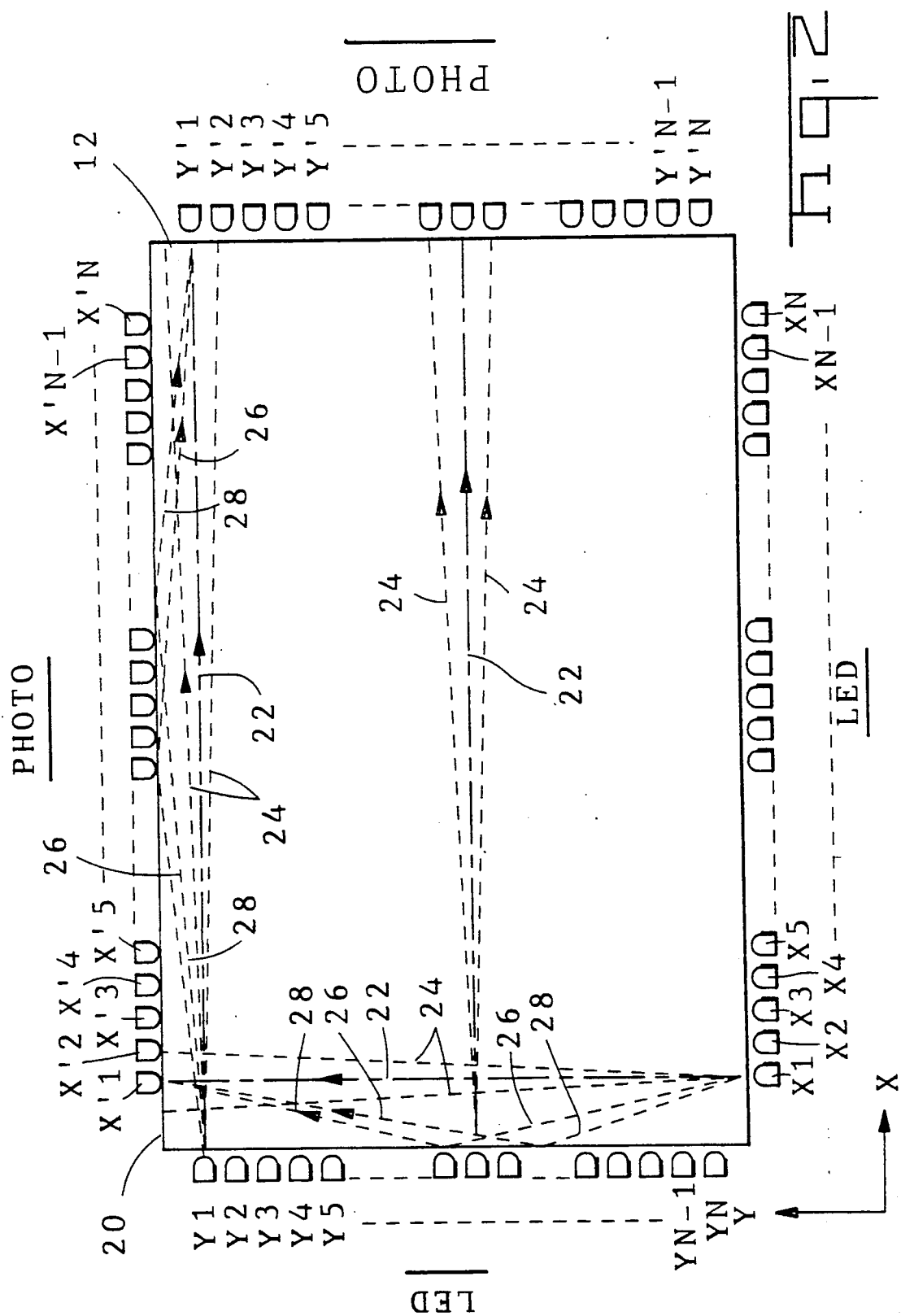

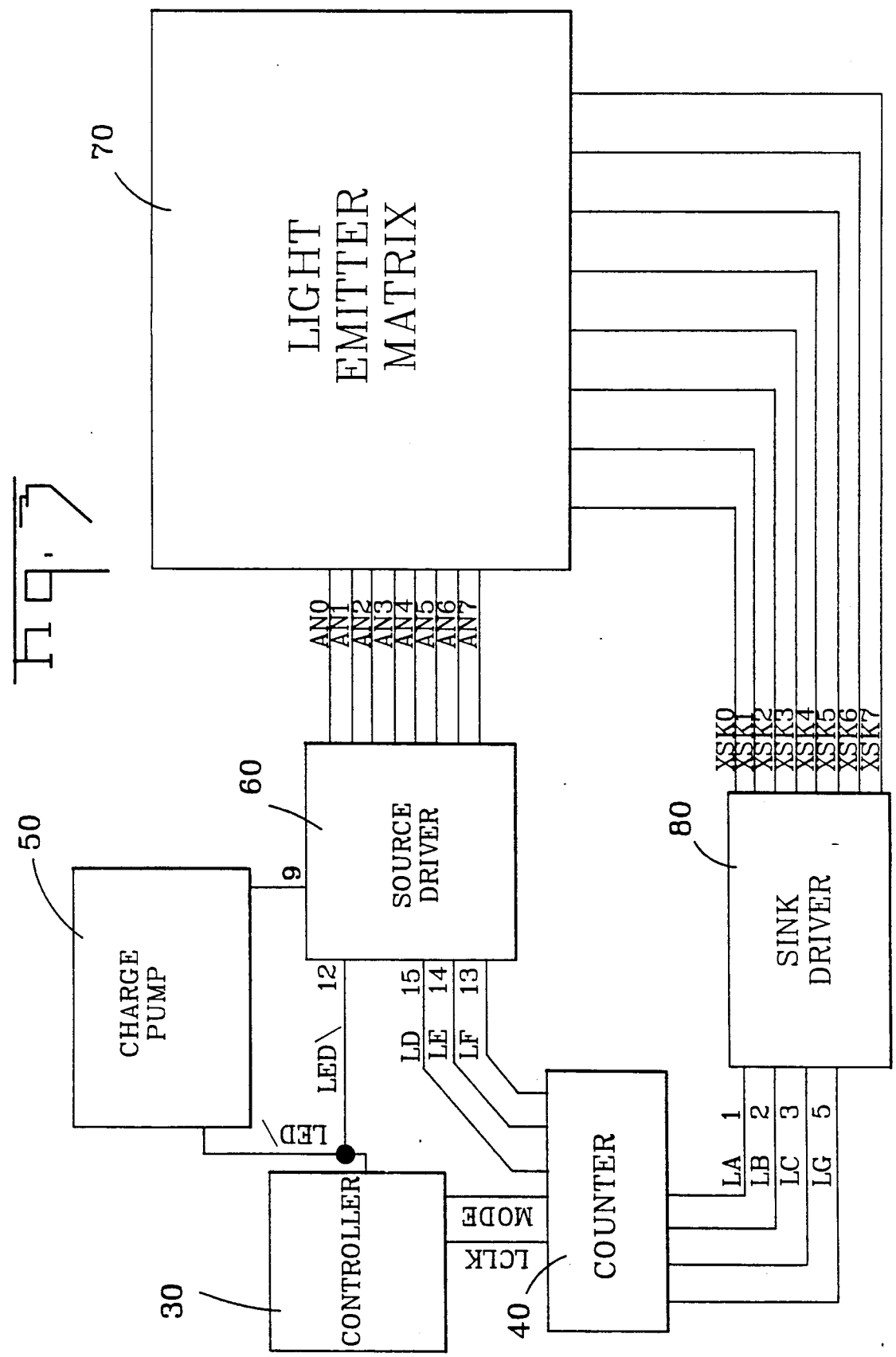

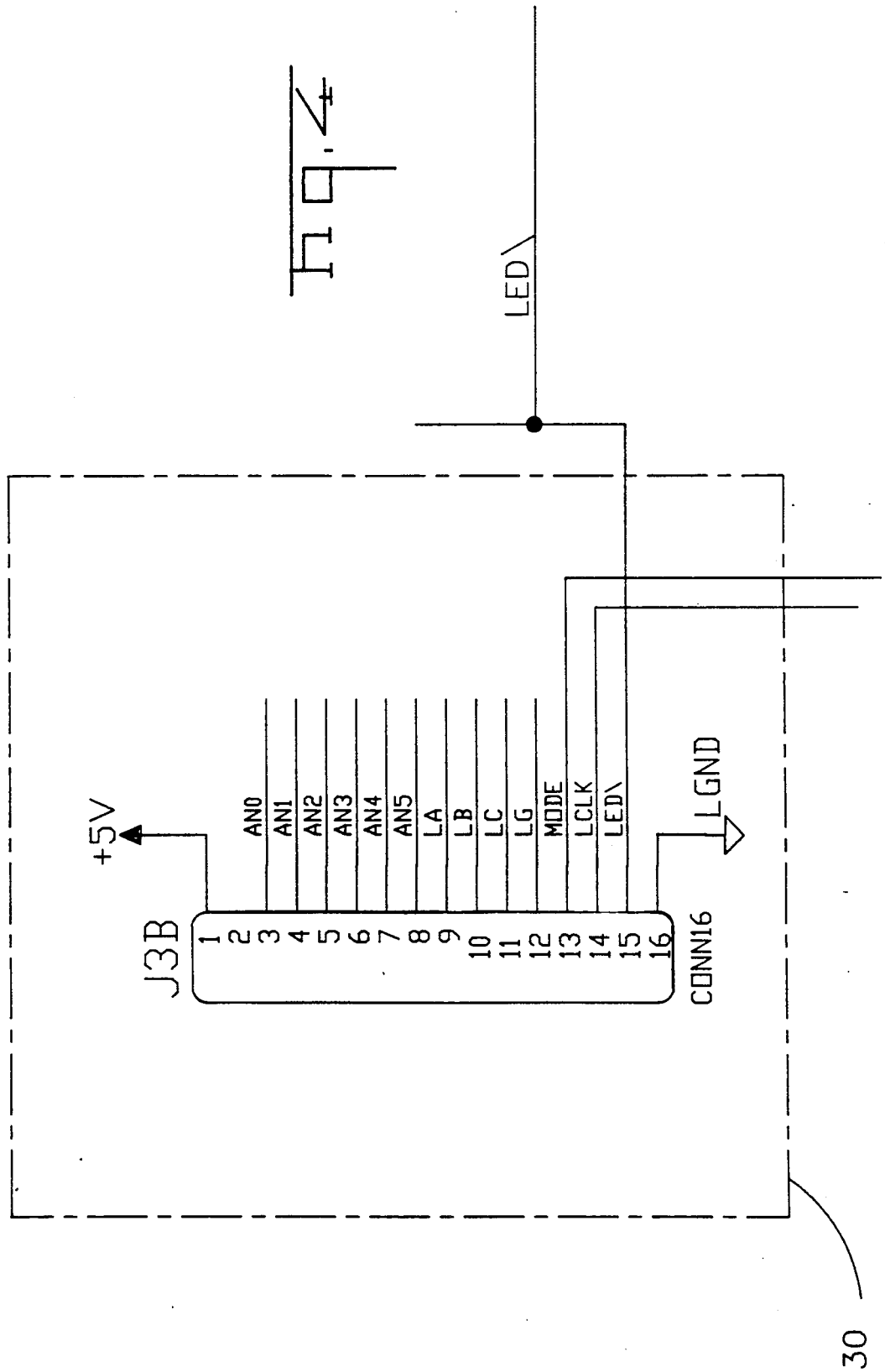

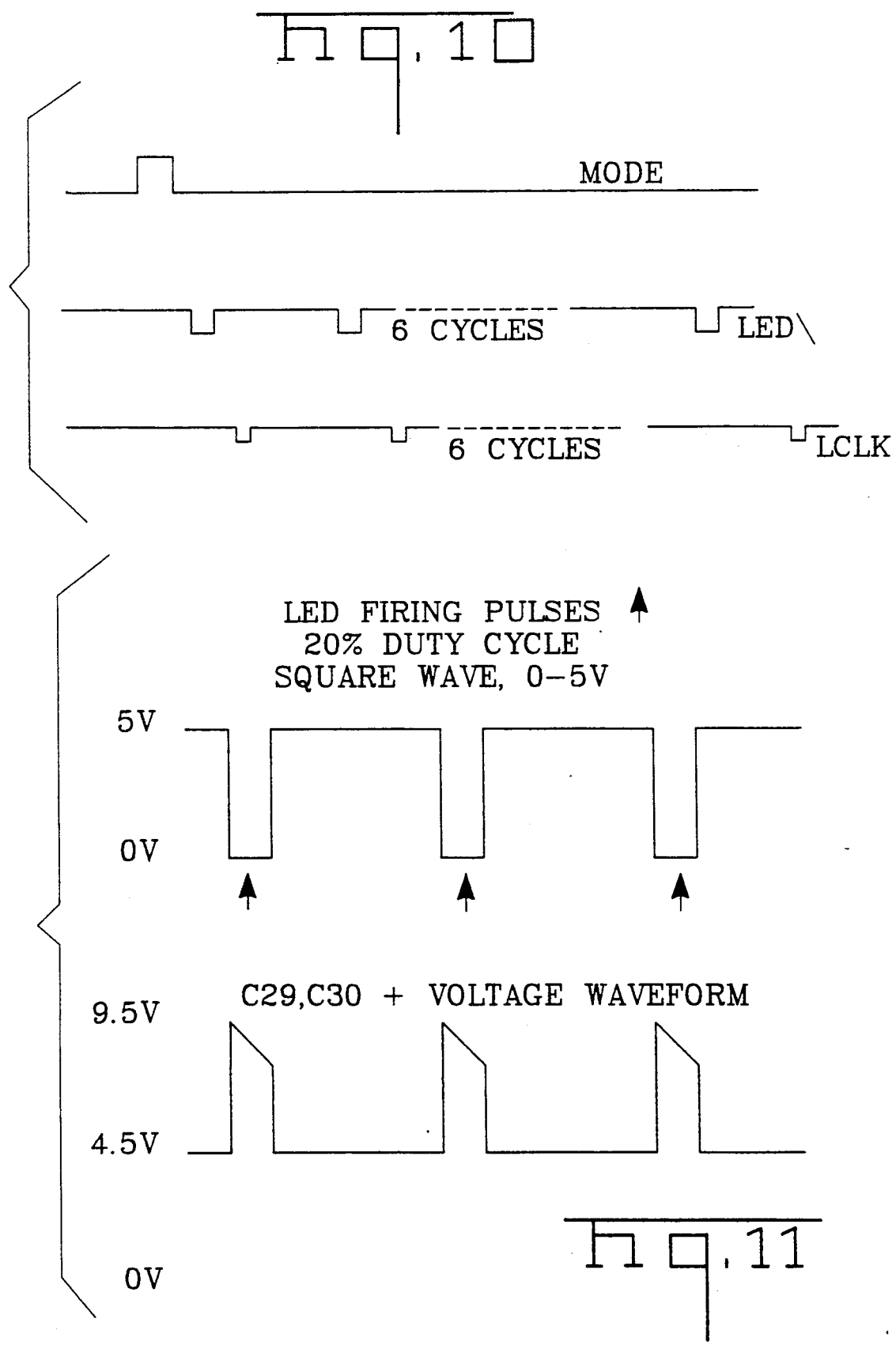

INFRARED TOUCH INPUT DEVICE AND LIGHT EMITTED ACTIVATION CIRCUIT

This application is a continuation of application Ser. No. 07/465,837 filed Jan. 16, 1990, now abandoned.

BACKGROUND OF THE INVENTION

1. Field of the Invention

This invention relates to a touch entry system for detecting the presence of an element in an irradiated field and, more particularly, to a touch entry system and circuit for use in a touch entry system for detecting the intrusion and relative location of an element present within an irradiated field generally adjacent to an electronic display, in which the irradiated field is formed by a plurality of light emitters and light detectors.

2. Description of the Prior Art

Along with the continued and increasing use of video displays has been the problem of the operator/machine interface. Traditionally, control of displayed information or cursors has been via the use of a keyboard. More recently, however, a number of devices allow an operator to directly interact with a video display. These devices have included light pens, desk-type mouse controllers, or touch input devices, such as switch matrixes or opto-electronic matrices. While switch-type overlays, placed adjacent to a video display, are generally inexpensive to apply and to utilize, they are also susceptible to contact wear as well as the distortion of the video information which is presented to the viewer or operator, particularly in situations involving a high degree of use. Opto-electronic matrix schemes utilizing light which is generally in the infrared region, however, create a matrix which is invisible to the viewer or operator and, therefore, do not distort the video information displayed and is not subject to wear in high use environments. Systems utilizing opto-matrix frames are well known in the art. An example of such a system includes U.S. Pat. No. 4,267,443 entitled Photoelectric Input Apparatus. U.S. Pat. No. 4,761,637 discloses a touch input device having individually addressable emitters and detectors in separate arrays.

Normally touch input devices employ a voltage source of five volts in order to support the logic normally used to perform the various functions in a touch input device. It is one of the objects of this invention to improve the activation of a plurality of light emitters using only a single five volt source. Whereas conventional touch input devices have individually addressable emitters such as LEDs, in which a five volt source provides the energy used to drive not only each emitter but also series elements consisting of a current source and a current sink used in addressing each individual emitter. Therefore it is the object of this invention to provide a current source having sufficient energy to drive the high resistance LED and addressing circuitry using only a single five volt voltage source for the touch input device. It is also an object of this invention to provide a suitable driving current for the LED without increasing the electrical noise in the touch input system. If a conventional charge pump type device or transformer means were employed in a touch input system, this would generate electrical noise which would complicate the detection of light beams.

With conventional infrared touch input systems, the use of a single five volt source with a light emitting diode and a source driver and a sink drive, it is not always possible to generate sufficient light from each of the multiple light emitting diodes used in a touch input device. The voltage drops across the sink and source drivers and across selected LEDs will in some cases be greater than average thus leading to a low signal output from that LED. This factor is largely due to the variations in the saturation voltages of the source and sink devices and the electrical performance of light emitting diodes manufactured using current technology. This factor greatly complicates the manufacture of a touch input system, particularly when a large number of LEDs are employed in the touch input system. At present, a touch input system using a single five volt energy source must be constructed and tested to determine if the light energy emitted by each light emitting diode is sufficient for detection by each associated photodetector. With current technology, many light emitting diodes driven from a five volt source possess adequate output for use in a infrared touch input system. It is therefore an object of this invent to provide a touch input device in which additional current can be supplied to each light emitting device using a single five volt power source, so that each light emitting diode or other light emitting element will supply sufficient light for detection by light detectors spaced at the opposite end of an irradiated display surface.

It is another object of this invention to provide a generally stable current so that the current though each LED is normalized to reduce variations in current through the various LEDs in the individually addressable matrix. Therefore the light levels around the LED matrix tend to be more constant.

Another object of this invention is to provide a touch input system in which each LED does not have to be driven by a current which would otherwise be necessary to drive the lowest light output LED of the matrix, thus increasing the light emitted by the LEDs which have inherently better performance. Such excessive light can cause problems in the operation of a touch input system. Using excessive current to drive LEDs also results in degradation of individual LEDs over time.

SUMMARY OF THE INVENTION

The touch input device which is the subject of this invention is used to detect the presence of an opaque element, such as a stylus or an operator's finger, within an irradiated display area, such as the display or a CRT used as an output for a computer. Such a touch input device would employ light emitting devices, such as LEDs and light detecting devices, such as photodetectors, disposed along the sides of the display area. In the preferred embodiment of this invention these light emitting elements would be disposed along two sides of a frame and the light detecting elements would be disposed on the opposite two sides of the frame around the periphery of the output display. This touch input device would include a voltage source suitable for driving the logic used in the touch input device. This voltage source would also supply the current to activate individual light emitting elements. These light emitting elements would be sequentially activated so that light beams would traverse the display area and the light from each light emitting diode would be incident upon an aligned photo detector, such as a photo transistor. In the preferred embodiment, the activation circuitry for the LEDs comprises a charge pump between the voltage source and the sequential activation means in the light emitting device circuitry. The energy storage capacitor is comprised of two parallel capacitors to increase the total energy available. A switching means is used to alternatively connect the negative side of the LED energy storage capacitors to the return side of the 5V energy source during the time interval between sequential activation of light emitting elements and to the positive side of the 5V energy source during the activation time of the light emitting element. A pedestal voltage comprised of the supply voltage, is thus established on a negative side of the capacitor activation of each light emitting element so that the voltage on the positive side of the capacitor is greater than the supply voltage of the voltage source during activation of each light emitting element. Thus adequate current through each light emitting device can be supplied to ensure that the light emitted from each light emitting element exceeds a minimum threshold necessary for satisfactory operation of the touch input device. Since switching occurs synchronously with activation of the light emitting element, no electrical noise is generated during the detection period which occurs while the light emitting element is active.

This invention is especially adapted to a touch input device which employs a plurality of light emitting elements configured in an array or matrix with source driver and sink driver means used to individually address specific LEDs for sequential activation.

BRIEF DESCRIPTION OF THE DRAWINGS

FIG. 2 shows the manner in which light emitting devices such as light emitting diodes and light detecting devices, in this case phototransistors, are disposed around the periphery of a visual display or irradiated field.

FIG. 3 is a diagram of the basic subassemblies of the light emitter activation circuitry.

FIG. 4 is a view of the basic input/output from the controller for this system.

FIG. 5 is a detailed schematic of the charge pump portion of the light emitter activation circuitry.

FIG. 10 is a timing diagram showing the levels of the LED, LCLK, and the MODE signals during the activation of a single light emitting element.

FIG. 11 is a schematic of the voltage on the positive side of a capacitor used in the charge pump portion of the light emitter activation circuitry.

DETAILED DESCRIPTION OF THE PREFERRED EMBODIMENT

Figure 1:
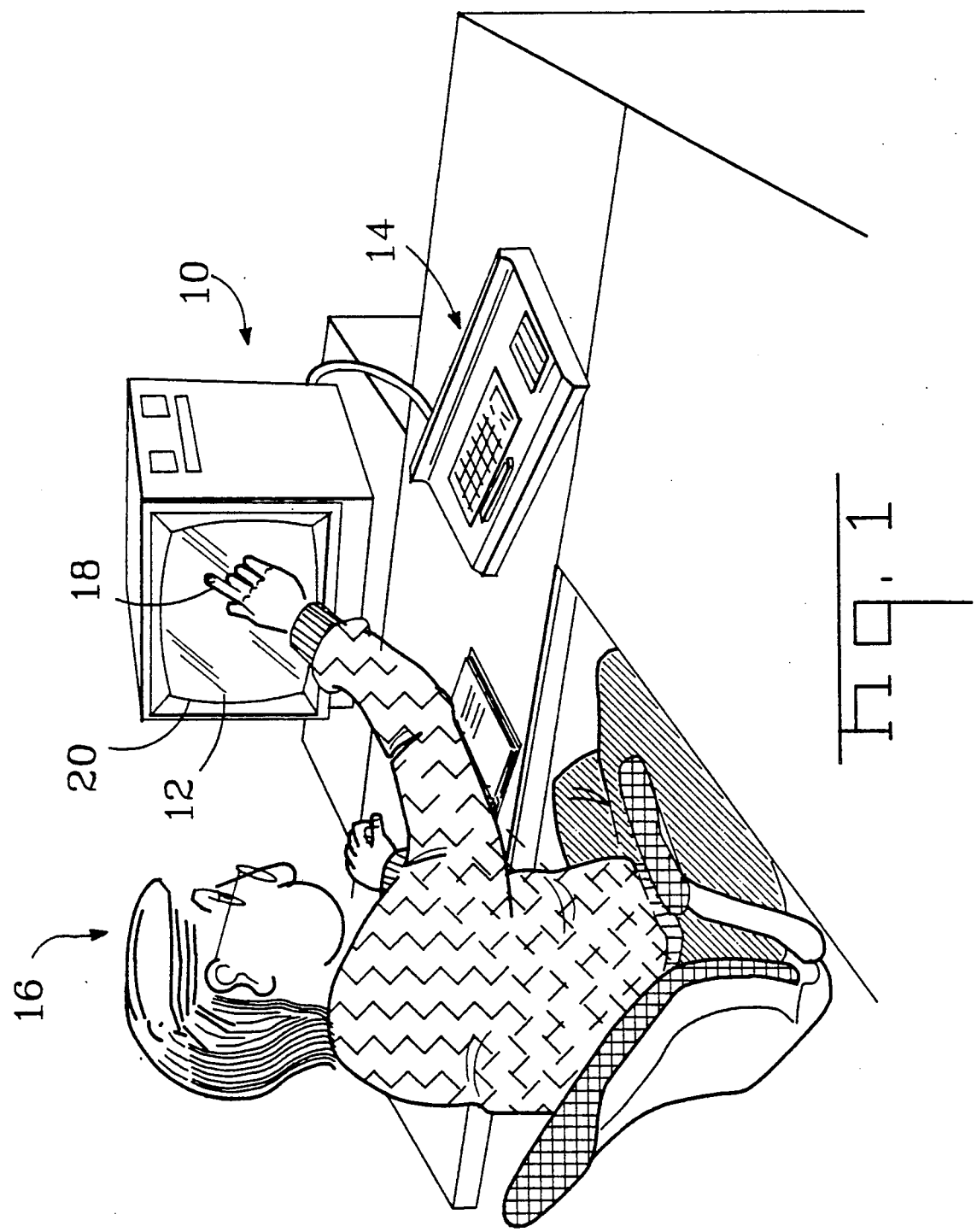
FIG. 1 shows the manner in which an operator interfaces directly with a visual display when a touch input device employing the present invention is employed.

FIG. 1 depicts the manner in which an operator can interact directly with information displayed on a CRT used in conjunction with a host computer such as a personal computer. The preferred embodiment of this invention is intended to provide real time inputs to a personal computer. As such, this device comprises means for transmitting real time input information directly to the host computer. It should be understood, however, that this invention could be adapted to process input information which could then be input to the host computer through an RS232 interface in a conventional manner.

As shown in FIG. 1, an operator 16 can interact through a CRT 10 displaying information on a screen 12 simply by directly touching specific locations on the screen 12. Infrared light emitting diodes and detectors, such as phototransistors, could be mounted in a bezel or frame 20 located on the periphery of the display area 12 in a conventional manner such that a plurality of infrared beam would scan the display area 12. When the operator would place his or her finger 18 at a specific location on the display area 12, one or more infrared beams, extending between aligned emitters and detectors, would be interrupted. The unique location of the operator's finger 18 would then be transmitted to the host computer. More generally, this invention provides a means by which an opaque element, such as the operator's finger 18 or other styli, could be detected when disposed within an irradiated field, such as the display screen 12, formed by positioning light emitting devices, such as phototransistors, around the periphery of the irradiated field with the individual light emitting devices being aligned with corresponding individual light detecting devices.

FIG. 2 shows arrays of light emitting devices and arrays of light detecting devices disposed around the periphery of an irradiated field 12. A touch input device, as depicted herein, when used with the display of a CRT, would be configured in this manner, with two orthogonal arrays of light emitting devices and two orthogonal arrays of photodetectors disposed along the sides of a rectangular display area 12. Light emitting diodes and phototransistors are commonly used for such touch input systems, although it should be understood that other light emitting devices and light detecting devices could be suitably employed. As shown herein, a Y array of light emitting diodes (LEDs), Y1 through YN, are located along the left of the 20 surrounding the display area or irradiated field 12. A similar array of light emitting diodes, X1 through XN, is located along the bottom of the frame 20. Arrays of phototransistors, X'1 through X'N, located along the top of the frame 20 and Y'1 through Y'N located along the right side of frame 20 are disposed such that individual corresponding LED's and phototransistors, such as X1-X'1 and X2-X'2 and Y1-Y'1 and Y2-Y'2, are aligned. Thus, when light is emitted by an individual light emitting device, such as X1, this light will be incident upon a corresponding aligned phototransistor X'1. FIG. 2 shows, however, that the light emitted by individual LEDs or other light emitting devices is incident not only upon the corresponding aligned photodetector but is also incident upon adjacent photodetectors. Note that while the light emitted along centerline 22 between emitter-detector pairs X1-X'1 will be incident on detector X'1, light emitted along line 24, within the dispersion angle of conventional light emitting devices, will be incident upon adjacent phototransistor X'2. Light indicated at 26 and 28 might also be incident upon sides of the frame 20 causing certain glare and reflection problems in practical touch input systems. A common method of ensuring that light emitted by a given light emitting device, X1, detected only by the corresponding light detecting device or phototransistor, X'1, and not by an adjacent light detecting device such as X'2, is to sequentially activate light emitting devices and sequentially scan the arrays of phototransistors. In other words, when a given light emitting device is activated and emits light, only the aligned phototransistor, is activated although the adjacent phototransistors are illuminated. Thus, activation of light emitting diode X1 would occur at the same time that phototransistor X'1 is activated to detect incident light. The adjacent phototransistor X'2, upon which light from LED X1 would also be incident, would not be turned on during the interval in which LED X1 is activated. Note that this sequential and synchronized activation of light emitting diodes and phototransistors permits accurate detection of the presence of an opaque element positioned between aligned LEDs and phototransistors. The light from an adjacent LED, which is not blocked by an opaque element disposed in the field, will not activate a "blocked" phototransistor simply because that LED will not be turned on during the activation interval of the "blocked" phototransistor. This sequential activation of light emitting devices and light detecting devices is achieved by conventional multiplexing techniques with scan rates of about twenty scans per second.

In the preferred embodiment of this invention both the light emitting elements and the light detecting elements are located in a matrix and are individually addressable. Although this invention is especially important in a touch input system using individually addressable light emitting elements, it should be understood that it could also be employed in a touch input device in which a plurality of light emitting elements are activated at the same time. The light emitter activation circuitry will be described in detail herein. The specific light detector activation circuitry employed to detect the presence or absence of light beams emitted by associated or corresponding light emitting elements, does not comprise an element of this invention, and it should be understood that any of a number of suitable detector configurations can be employed. U.S. Pat. No. 4,761,637 shows an individually addressable light detector activation circuit which could be employed by this invention. The disclosure of that patent is incorporated herein by reference.

Figure 7:
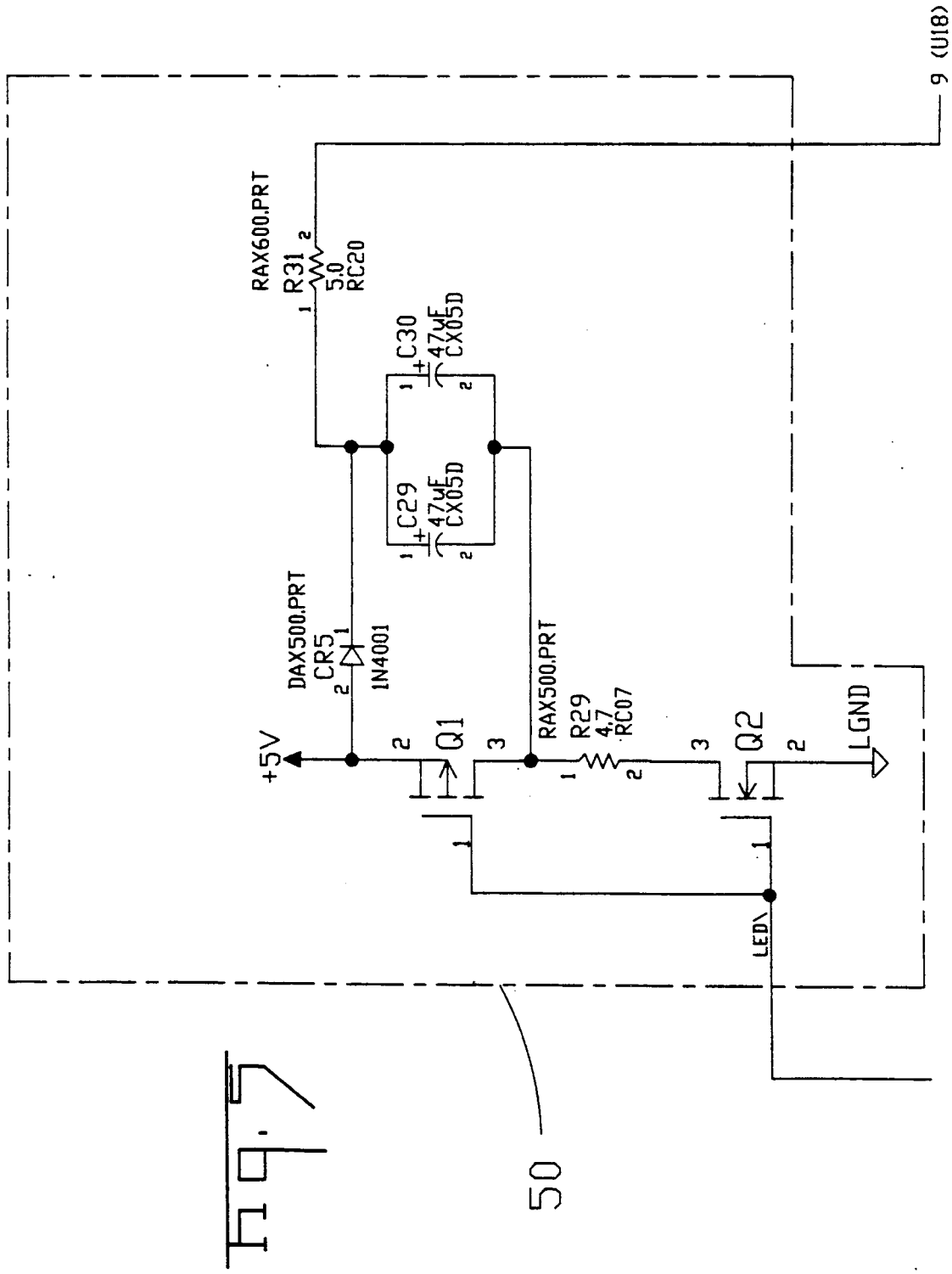
FIG. 7 is a view of the source driver portion of the circuitry.
Figure 6:
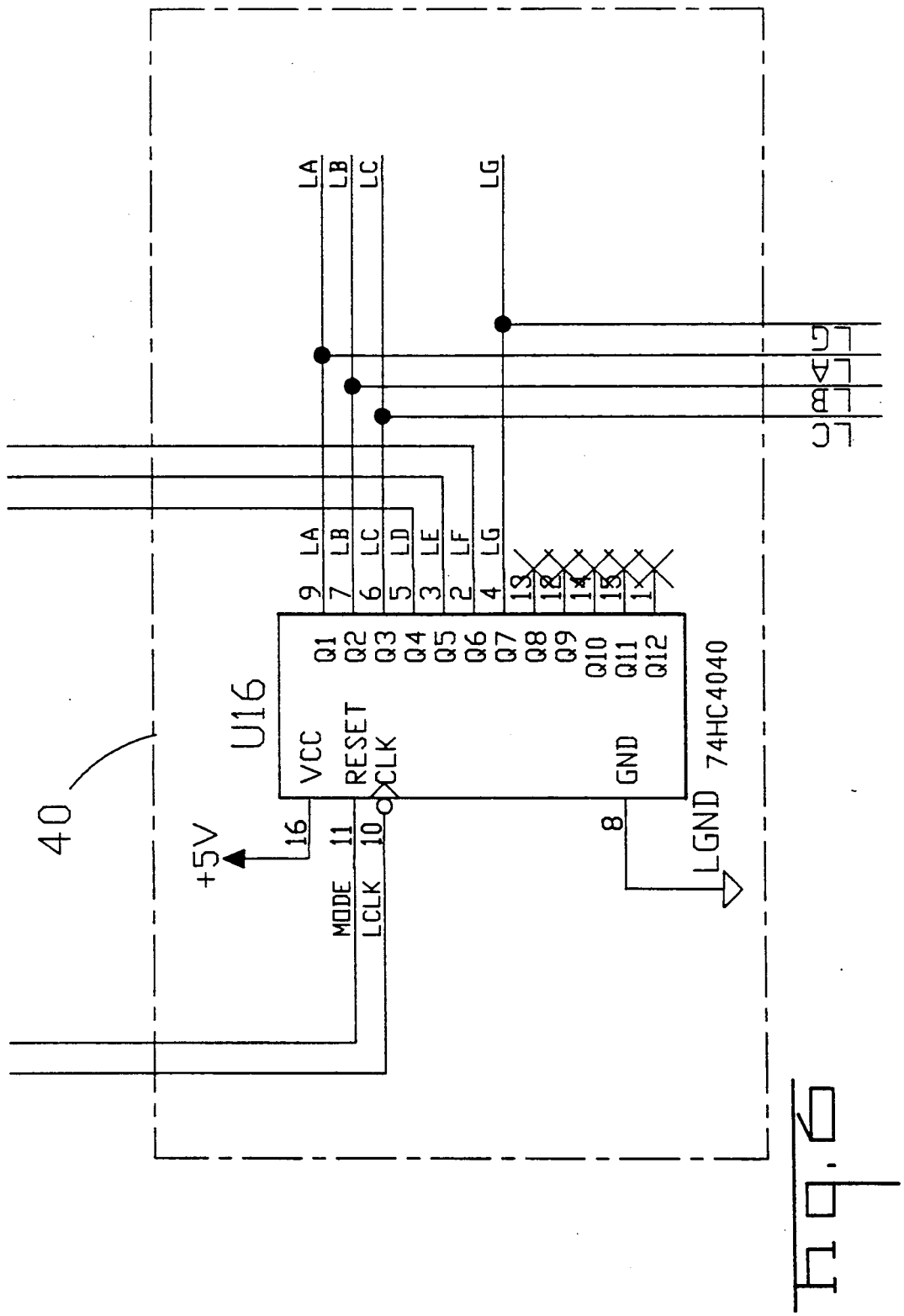
FIG. 6 is a detailed schematic of the counter portion of the light emitter activation circuitry.
Figure 7:
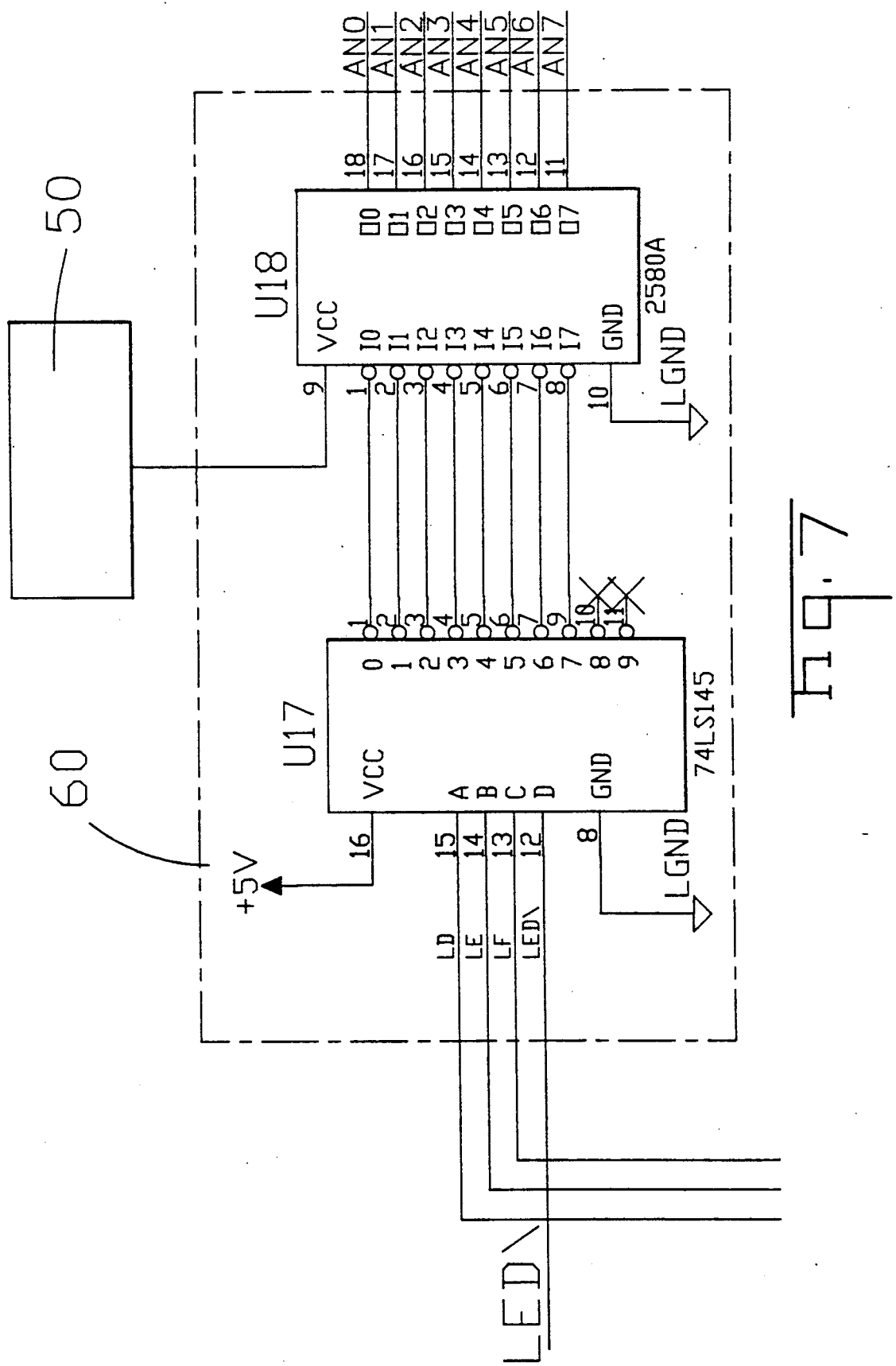
Figure 8:
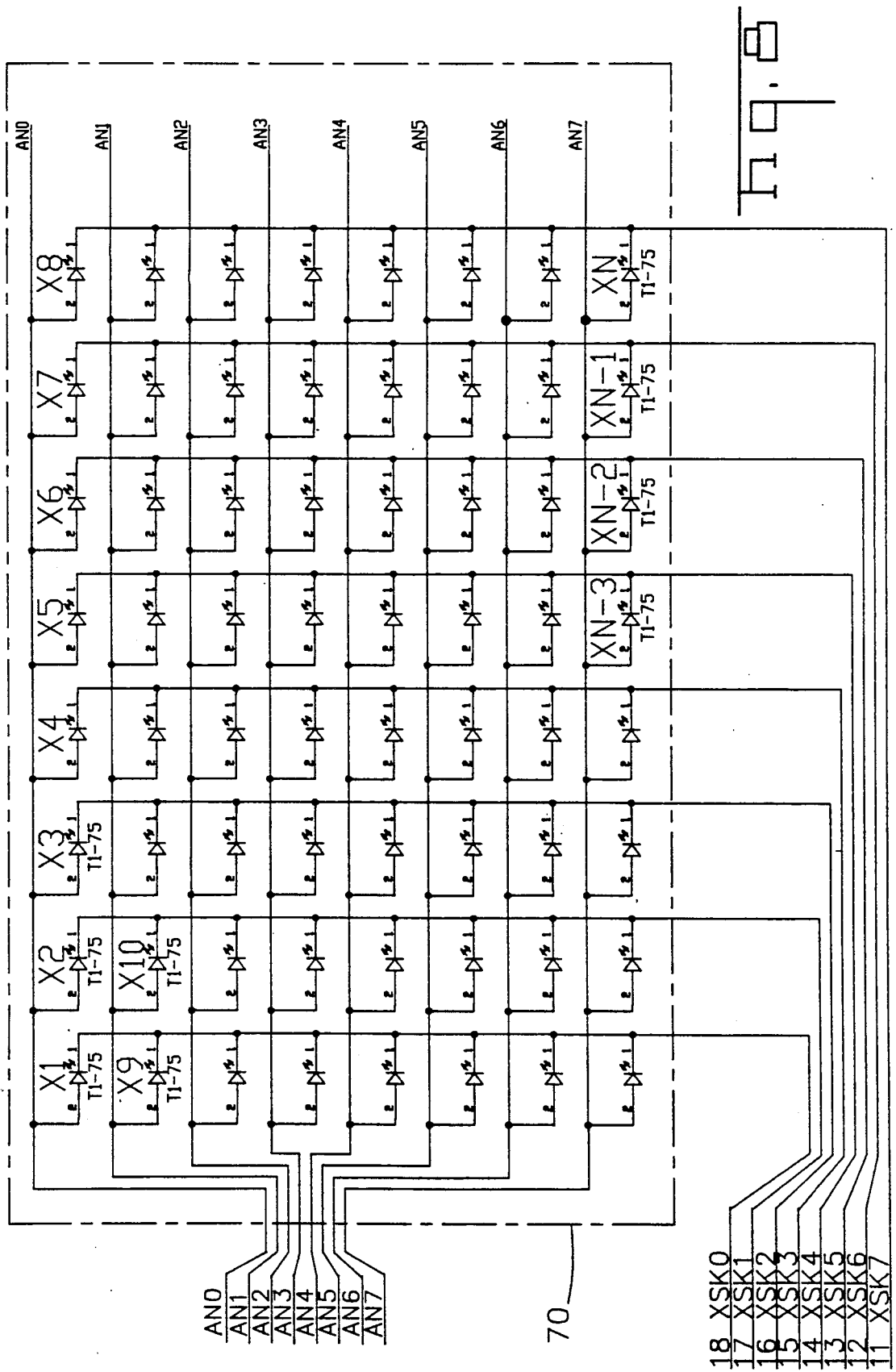
FIG. 8 is a schematic showing the light emitting element or LED matrix for an X-array or matrix.
Figure 9:
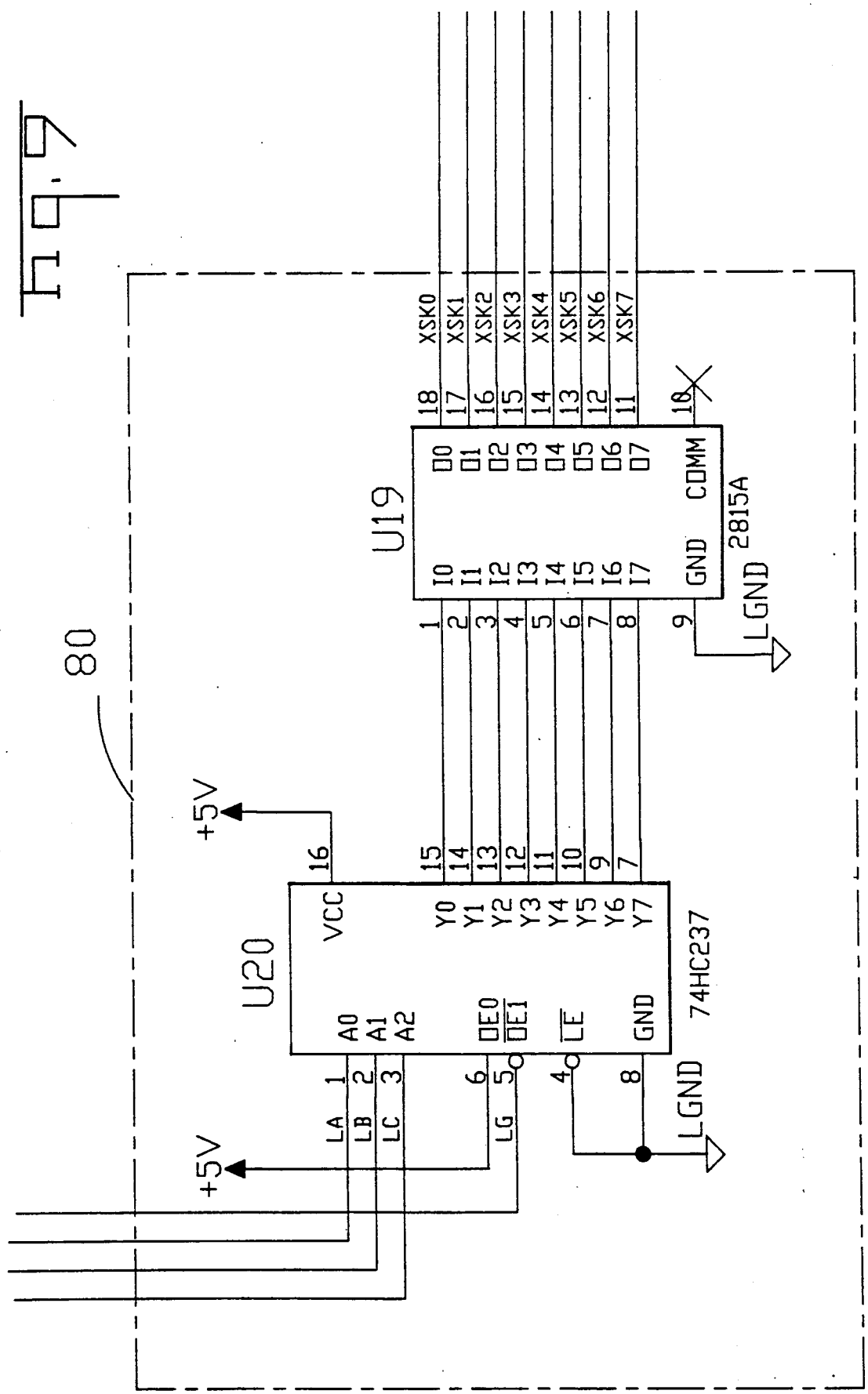
FIG. 9 is a detailed schematic of the sink driver portion of the light emitter activation circuitry.

FIG. 3 is a diagram illustrating the various principle portions of the light emitting element activation circuitry. FIGS. 4 through 9 contain detailed descriptions of the specific portions of the light emitter activation circuitry shown in FIG. 3. FIG. 3 shows that the light emitter activation circuitry is under the control of a controller 30 which can be in the form of a processor or other logic means used to control not only the light emitter elements but also the other elements of the touch input system. It should be understood that the controller 30 could be a part of the touch input device attached to the output display of a computer, or a portion of the logic in the computer itself could be employed to supply the logical control over the touch input elements. Three signals, MODE, LCLK, and LED are used to activate the various portions of the light emitter activation circuitry in a manner in which the individual light emitting elements X1-XN and Y1-YN can be individually addressed. A counter 40 is responsive to the MODE and LCLK signals from controller 30. Charge pump 50 is responsive to the LED signal from the controller 30. Counter 40 increments a source driver 60 and a sink driver 80 to address individual light emitting elements, such as light emitting diodes in the light emitter matrix 70. A five volt voltage source, augmented in a manner to be discussed subsequently by charge pump 50 supplies the current to drive the source driver 60, the individually addressable light emitters in the matrix 70 and the sink driver 80. The counter 40 and the source driver 60 and the sink driver 80 comprise sequential activation means providing individual sequential activation of each light emitting element X1-XN and Y1-YN. As shown in FIGS. 6, 7 and 8, the counter 40, the source driver 60 and the sink driver 80 comprise standard integrated circuit components. The counter 40 comprises a component designated U16 in FIG. 6 which when the preferred embodiment comprises a conventional 74HC4040 twelve stage binary counter component configured in the manner shown in FIG. 6. The source driver 60 comprises two conventional components U17 and U18 which comprise a 74LS145 one-of-ten decoder driver—open collector device and a 2580A eight channel high current source driver device configured in the manner shown in FIG. 7. The sink driver 80 also comprises two components U20 and U19 which respectively comprise a 74HC237 three-to-eight decoder/demultiplexer component and a 2815A eight channel darlington driver component configured as shown in FIG. 9.

The light emitting elements X1-XN and Y1-YN in FIG. 8 contain rows and columns of light emitting diodes. The anode side of each row of light emitting diodes in matrix 70 is selectively addressable by one line emanating from the source driver 60. Each column in turn is selectively addressable from interconnection of each cathode by one line communicating with the sink driver 80. Since each light emitting diode X1-XN as shown in FIG. 8, has a unique row and column address, each light emitting diode is individually addressable by the source driver 60 and the sink driver 80. FIG. 8 shows only the X-array of light emitting diodes X1-XN. It should be understood, however, that a similar array of Y light emitting diodes would be employed in a touch input system having light emitting elements located along two axes as shown in FIG. 2.

As shown in FIG. 3, the charge pump portion 50 of the light emitter activation circuitry is specifically intended to sequentially boost or enhance the supply voltage provided by a voltage source. In the preferred embodiment of this invention this voltage source generates a five volt supply voltage which is suitable for activating the logic in this circuitry as well as in the light detection circuitry. The charge pump portion 50 of the light emitter activation circuitry is located between the voltage source and the source driver 60, which comprises a portion of the sequential activation means. As shown in FIG. 5 this charge pump portion 50 includes a switching means comprising two transistors Q1 and Q2, each responsive to the LED\signal emanating from the controller. In the preferred embodiment, Q1 is a P Channel Field effect transistor, and Q2 is an N Channel Field effect transistor. Note that the first transistor Q2 is conductive when LED\is in one state whereas the second transistor Q1 is conductive when the LED\signal is in another state. Transistors Q1 and Q2 thus comprise switch means used to switch the capacitors from a first state or charge mode to a second state or activating mode. In the activating mode the capacitors are precharged to approximately the supply voltage 5V, and are coupled additively in series with the supply voltage thus establishing the supply voltage as a 5V pedestal to the loop formed by the supply voltage, charged capacitors and load. The first transistor Q2 is connected through resistor R29 to the negative side of the parallel capacitors C29, C30. The positive side of these parallel capacitors C29, C30 is in turn connected to the five volt voltage source through a diode CR5. When the transistor Q2 is conductive, the voltage substantially equal to the five volt- voltage supply is established on the positive side of the parallel capacitors C29, C30. This comprises the charge mode of the charge pump portion 50. First transistor Q2 connected between the negative side of the capacitors C29, C30 and ground is close circuited during the interval between activation of sequentially activated light emitting elements to establish the first voltage, substantially equal to the five volt supply voltage at the positive side of the capacitor. This first transistor Q2 is open circuited when each light emitting element X1-XN is sequentially activated. The second transistor Q1 is connected between the voltage source and the negative side of the capacitor C29, C30. The second transistor Q1 is close circuited when each light emitting element is activated to establish the supply voltage as a pedestal voltage on the negative side of the capacitor. Note that in the activating mode, the second transistor Q1 is conductive, and the diode CR5 connected between the voltage source and the positive side of the capacitors C29, C30 is reverse biased and not conductive. During the activating mode in which transistor Q1 is activated, the voltage on the positive side of capacitors C29, C30 (which exceeds the voltage supplied by the five volt power supply) is delivered through resistor R31 to source drive component U18. FIG. 11 shows a typical variation in the voltage on the positive side of the capacitors C29, C30 during sequential activation cycles of the light emitting circuitry by a supply voltage of five volts. Note that the voltage on the positive side of capacitors C29, C30 exceeds the supply voltage of five volts during the interval in which one of the light emitting diodes X1-XN is activated. Resistor R31 comprises a current limiting resistor and can be used in this circuitry to establish a generally constant current through the source driver U18, the activated light emitting diode X1-XN and the sink driver component U19. Use of the charge pump portion 50 in this manner ensures that each light emitting element X1-XN emits an amount of light exceeding a minimum threshold. This minimum threshold is sufficient to ensure that light which is not blocked by an opaque element, such as the operator's finger 18, striking a corresponding light detecting element will have enough strength to be detected by the respective light detecting element or phototransistor.

Referring to FIGS. 3 through 11, the operational sequence of the light emitter drive or activation circuitry is as follows. The initial state of the touch input system is indeterminate. The system is initialized by setting the MODE signal and the LED\signal. Setting the MODE signal resets the counter U16 to all zeroes. The LED\signal initially turns off all of the LEDs. The MODE signal is then released while the LED\ signal remains asserted. The effect of these actions sets U17 to 8, which is not used, and U20 to Y0. Even though U20-Y0 turns on driver 0 of U19, since U17 is set to an unused pin, U18 is not driven and therefore none of the LEDs are turned on. The charge pump is controlled by the LED\signal and is set with Q1 turned off and Q2 turned on charging the capacitors C29 and C30, which in the preferred embodiment of this invention comprises two 47 microfarads capacitors, through diode CR5 and resistor R29. The first LED X1 is turned on by clearing LED\. This changes U17 from output 8 to 0, which through the first source driver of U18, applies voltage from the charge pump 50 to the top row of LED anodes. The other effect of clearing LED\switches the voltage at the charge pump. With LED\low, Q2 turns off and Q1 turns on, connecting the negative side of the C29, C30 capacitor to the +5 volts supplied as the supply voltage through Q1. The positive end of C29, C30 is now elevated to approximately 9 volts which is applied as the supply voltage to U18 through resistor R31. Diode CR5 is now reverse biased since the positive end of C29, C30 is greater than 5 volts.

The LED is turned off by re-asserting LED\ changing U17 back to output 8. This also returns the charge pump to the charge mode.

Next light emitting element X2, is addressed by toggling LCLK which increments U16 in this case from 0000000 to 0000001. With signal LA now equal to 1, U20 selects a Y1 which through U19 provides a near ground current source to the cathodes of the light emitting elements in the second column in the matrix 70.

Again, by clearing LED\, the first voltage driver of U18 applies the charge pump's voltage to the top row of the LED anodes. This matrix address turns on light emitting element X2. The LED\signal is asserted once again to turn off this LED. This process continues for six more cycles sequencing through all of the LEDs in the first row.

Toggling LCLK one more time causes U16 to increment to 0001000. When the LED\signal is low, this will now address U17 output 1 selecting (through U18) the second row. Note that the column address (U20, U19) returns to 000 mapping to the first light emitting element in the second row of the matrix.

After incrementing U16 through the X-LED matrix, the count goes from 0111111 (63) to 1000000 which is the appropriate address for the LED Y1 located in the Y array of light emitting elements. The sequence is essentially the same except that now X row cathode drivers U20 and U19 are disabled since LG is high (this control input for U20 is active low). Corresponding component for the Y-LEDs is now active since its control input is active high.

Although the preferred embodiment of this invention is especially suitable for use with individually addressable light emitting elements, it should be understood that this manner of sequentially enhancing the voltage supplied to light emitting elements can be used with other configurations and addressing schemes for the light emitting elements. Also other light emitting elements besides the LEDs used in the preferred embodiment of this invention could be employed. Therefore it should be apparent to one of ordinary skill in the art that other light emitter activation circuits could employ this invention although differing in other ways from the specific circuitry depicted in the preferred embodiment of this invention. Furthermore voltage enhancement means other than a charge pump could be employed. For example, transformer means could be used.

I claim:

1. A touch input device for detecting the presence of an opaque element within an irradiated display area, comprising:
   a plurality of light emitting elements individually aligned with a plurality of light detecting elements located on an opposite side of the display area so that a beam of light emitted by a respective one of said light emitting elements is detected by a respective one of said light detecting elements aligned therewith unless an opaque element is positioned between said light emitting element and said light detecting element aligned therewith thereby interrupting said emitted light beam;

means for processing the detection of light or absence of light by said light detecting elements to determine and indicate the absence of or at least the presence and location of a said opaque element, respectively;

a common voltage source generating a supply voltage;

means for sequentially activating individual ones of said light emitting elements to generate light beams traversing said display area and incident upon respective aligned ones of said light detecting elements; and a common voltage enhancement means between said voltage source and said sequential activation means, said voltage source upon activation of a respective one of said light emitting elements being electrically connected in series with the negative side of a capacitor of said voltage enhancement means, and the positive side of said capacitor being connected in series with a respective one of said light emitting elements, upon said activation power thereby being transmitted to said one of said light emitting elements from both said voltage source and said voltage enhancement means simultaneously, said voltage enhancement means establishing a voltage at the positive side of said capacitor during a time interval between activation of sequentially activated ones of said light emitting elements and establishing the supply voltage as a series additive pedestal voltage at the negative side of said capacitor upon activation of each said light emitting element so that the voltage on the positive side of said capacitor is greater than the supply voltage of said voltage source during activation of each said light emitting element, thereby being synchronous with said sequential activation, whereby the common voltage enhancement means and common voltage source insure that the light emitted by each said light emitting element exceeds a minimum threshold, while synchronous operation of the voltage enhancement means results in generating minimal electrical noise and thereby maintaining the integrity of the functioning of the touch input device.

2. The touch input device of claim 1 wherein said light emitting elements are located on two sides of the display area and said light detecting elements are located opposite said two sides.

3. The touch input device of claim 1 wherein said sequential activation means comprises source driver means and sink driver means, said light emitting elements being electrically connected therebetween.

4. The touch input device of claim 3 wherein said light emitting elements are connected to said source driver means and said sink driver means in a matrix so that each said light emitting element is individually addressable.

5. The touch input device of claim 1 wherein each said light emitting element comprises a light emitting diode.

6. The touch input device of claim 1 wherein said voltage enhancement means comprises charge pump means including switch means connected between said voltage source, said light emitting elements and a negative side of said capacitor, said switch means being switchable between a first state and a second state, said switch means being in said first state during the interval between activation of respective ones of said sequentially activated light emitting elements and said switch means being then electrically connected between said voltage source and said capacitor for charging said capacitor, and said switch means being in said second state during activation of each said light emitting element and being then electrically in series between said light emitting element and both said voltage source and said capacitor, said capacitor being partially discharged by said switch means in said second state.

7. The touch input device of claim 6 wherein said switch means comprises a first transistor and a second transistor.

8. The touch input device of claim 1 wherein said voltage enhancement means comprises said capacitor, a first transistor and a second transistor, and a diode, said second transistor being connected between said voltage source and said negative side of said capacitor, said first transistor being connected between ground and said negative side of said capacitor, and said diode being connected between said voltage source and said positive side of said capacitor.

9. The touch input device of claim 8 wherein said first transistor is close circuited during the interval between activation of said sequentially activated light emitting elements to establish a first voltage at the positive side of said capacitor.

10. The touch input device of claim 9 wherein said first transistor is open circuited and said second transistor is close circuited when each said light emitting element is activated to establish a pedestal voltage on the negative side of said capacitor.

11. Apparatus for detecting the presence of an opaque object, comprising:

sequentially activatable light emitting means generating light incident upon associated light detecting means;

means for activating said light emitting means including:

a common voltage source generating a supply voltage; and a common voltage enhancement means between said voltage source and said light emitting means, said voltage source upon activation of a respective one of said light emitting means being electrically connected in series with the negative side of a capacitor of said voltage enhancement means, and the positive side of said capacitor being connected in series with a respective one of said light emitting means, upon said activation power thereby being transmitted to said respective one of said light emitting means from both said voltage source and said voltage enhancement means simultaneously, said voltage enhancement means establishing a voltage on the positive side of said capacitor when said light emitting means are off and establishing the supply voltage as a series additive pedestal voltage at the negative side of said capacitor upon activation of each said light emitting means so that a voltage greater than said supply voltage is available for activating said light emitting means, thereby being synchronous with sequential activation of said light emitting means, whereby the common voltage enhancement means and common voltage source insure that the light emitted by each said light emitting means exceeds a minimum threshold, while synchronous operation of the voltage enhancement means results in generating minimal electrical noise and thereby maintaining the integrity of the functioning of the apparatus.

12. The apparatus of claim 11 wherein said means for activating said light emitting means for activating said light emitting means is adapted to sequentially activate said light emitting means.

13. The apparatus of claim 12 wherein said means for sequentially activating said light emitting means includes logic means responsive to said supply voltage.

14. The apparatus of claim 13 wherein said means for sequentially activating said light emitting means comprises a source driver and a sink driver controlled by said logic means.

15. The apparatus of claim 14 wherein said logic means further comprises a microprocessor supplying activating signals to said light emitting means and to said voltage enhancement means.

16. The apparatus of claim 11 wherein said supply voltage is five volts and the voltage provided to a said light emitting element from said voltage source and said voltage enhancement means in series therewith during activation thereof is greater than five volts.

17. The apparatus of claim 11 wherein said light emitting means comprises a plurality of light emitting elements and said light detecting means comprises a plurality of individual light detecting elements.

18. The apparatus of claim 17 wherein said light emitting elements are configured in an individually addressable matrix, each said light emitting element being addressable by source driver means and sink driver means.

19. The apparatus of claim 18 wherein said light emitting elements comprise light emitting diodes.

20. The apparatus of claim 11 wherein said voltage enhancement means comprises said capacitor, a first transistor and a second transistor, and a diode, said second transistor being connected between said voltage source and said negative side of said capacitor, said first transistor being connected between ground and said negative side of said capacitor, and said diode being connected between said voltage source and said positive side of said capacitor.

21. A touch input device for detecting the presence of an opaque element, comprising:
a plurality of sequentially activatable light emitting elements individually aligned with a plurality of light detecting elements, light from each one of said light emitting elements being incident upon an associated one of said light detecting elements unless interrupted by the presence of an opaque object;
means for activating said light emitting elements including:
a common voltage source generating a supply voltage;
a common charge pump means switchable between a charge mode and an activating mode, said charge pump means being electrically connected in series with said voltage source to a respective one of said light emitting elements upon activation thereof by said activation means to transmit power to said one of said light emitting elements from both said voltage source and said charge pump means simultaneously, said charge pump means adapted to store a voltage of up to an amount approximately equal to said supply voltage during said charge mode, and during said activating mode to supply power to a said respective one of said light emitting elements at a voltage greater than said supply voltage; and
control means for generating a first signal and a second signal, said fist signal selecting an individual one of said light emitting elements, each said individual one of said selected light emitting elements being activated by changes in said second signal and said charge pump means being switched from the charge mode to the activating mode by changes in said second signal and thereby being synchronous therewith,
whereby the common charge pump means and common voltage source insure that the light emitted by each said light emitting element exceeds a minimum threshold, while synchronous operation of said charge pump means results in generating minimal electrical noise and thereby maintaining the integrity of the functioning of the touch input device.

22. The touch input device of claim 21 further including driver means responsive to said first signal from said control means, for selecting an individual one of said light emitting elements.

23. The touch input device of claim 22 wherein said driver means comprises source driver means and sink driver means.

24. The touch input device of claim 23 wherein said source driver means is selectively connected to said light emitting elements in a plurality of rows and said sink driver means is selectively connected to light emitting elements in a plurality of columns, said rows and columns forming a matrix in which each said light emitting means is individually selectively addressable.

25. The touch input device of claim 24 wherein said control means is responsive to said supply voltage.

26. The touch input device of claim 21 wherein said charge pump means is adapted to store a voltage by including a capacitor and a switch means connected between said voltage source, said light emitting elements and a negative side of said capacitor, said switch means being switchable between a first state and a second state, said switch means being in said first state during the interval between activation of respective ones of said sequentially activated light emitting elements and said switch means being then electrically connected between said voltage source and said capacitor for charging said capacitor, and said switch means being in said second state during activation of each said light emitting element and being then electrically in series between said light emitting element and both said voltage source and said capacitor, said capacitor being partially discharged by said switch means in said second state.

* * * * *

UNITED STATES PATENT AND TRADEMARK OFFICE
CERTIFICATE OF CORRECTION

PATENT NO. : 5,055,840

DATED : October 8, 1991

INVENTOR(S) : Alan L. Barlett

It is certified that error appears in the above-identified patent and that said Letters Patent is hereby corrected as shown below:

On the title page, item [54], line 2, and col. 1, line 2, delete the word "EMITTED" and insert the word --EMITTER--.

Claim 12, column 11, lines 13-14, delete the words "for activating said light emitting means".

Claim 21, column 12, line 15, delete "fist" and insert the word --first--.

Signed and Sealed this

Second Day of March, 1993

Attest:

STEPHEN G. KUNIN

Attesting Officer     Acting Commissioner of Patents and Trademarks